(12) United States Patent
Hopperstad

(10) Patent No.: US 7,440,357 B2
(45) Date of Patent: Oct. 21, 2008

(54) METHODS AND SYSTEMS FOR DETERMINING SIGNATURES FOR ARRAYS OF MARINE SEISMIC SOURCES FOR SEISMIC ANALYSIS

(75) Inventor: Jon-Fredrik Hopperstad, Petersfield (GB)

(73) Assignee: Westerngeco L.L.C., Houston, TX (US)

( * ) Notice: Subject to any disclaimer, the term of this patent is extended or adjusted under 35 U.S.C. 154(b) by 0 days.

(21) Appl. No.: 11/610,935

(22) Filed: Dec. 14, 2006

(65) Prior Publication Data

US 2007/0258322 A1 Nov. 8, 2007

(30) Foreign Application Priority Data

Dec. 23, 2005 (GB) ................. 0526280.3

(51) Int. Cl.
*G01V 1/00* (2006.01)
(52) U.S. Cl. ...................................................... 367/41
(58) Field of Classification Search ................... 367/41, 367/21
See application file for complete search history.

(56) References Cited

U.S. PATENT DOCUMENTS

| | | | | |
|---|---|---|---|---|
| 4,476,550 | A | * 10/1984 | Ziolkowski et al. | 367/21 |
| 4,476,553 | A | 10/1984 | Ziolkowski et al. | |
| 4,648,080 | A | 3/1987 | Hargreaves | |
| 4,658,384 | A | * 4/1987 | Dragoset et al. | 367/23 |
| 4,827,456 | A | * 5/1989 | Brac | 367/23 |
| 4,868,794 | A | * 9/1989 | Ziolkowski et al. | 367/23 |
| 4,899,321 | A | * 2/1990 | Solanki | 367/48 |
| 4,908,801 | A | * 3/1990 | Bell et al. | 367/23 |
| 5,247,486 | A | 9/1993 | Regnault | |
| 6,018,494 | A | * 1/2000 | Laws | 367/23 |
| 6,081,765 | A | * 6/2000 | Ziolkowski | 702/17 |
| 6,256,589 | B1 | * 7/2001 | Gallotti Guimaraes | 702/18 |

(Continued)

FOREIGN PATENT DOCUMENTS

EP 0 066 423 A1 12/1982

(Continued)

OTHER PUBLICATIONS

Krail et al. Deconvolution of a directional marine source. Geophysics. vol. 55. No. 12. Dec. 1990. pp. 1542-1548.*

(Continued)

*Primary Examiner*—Mark Hellner
(74) *Attorney, Agent, or Firm*—Steven Gahlings, Esq.; James McAleenan, Esq.; Jody Lynn DeStafanis, Esq.

(57) ABSTRACT

Embodiments of the present invention provide systems and methods for deriving a source signature for an array of seismic sources for marine seismic analysis, wherein the systems and methods include factors for determining the source signature taking into consideration both sea-surface and sea-floor reflections of signals produced by the seismic sources. In certain aspects, reflection coefficients of the sea-surface and the sea-floor and relative lengths of paths between a seismic source image and a detector are applied to a series of simultaneous equations that are solved using measurements of the pressure field produced by the array at a plurality of known locations to determine individual source signatures for each seismic source in the array and these individual source signatures may then be superposed to provide a source signature for the array that accounts for sea-floor reflections of outputs from the seismic sources.

26 Claims, 8 Drawing Sheets

U.S. PATENT DOCUMENTS

| | | | |
|---|---|---|---|
| 6,788,618 B2 * | 9/2004 | Clayton et al. | 367/13 |
| 7,218,572 B2 * | 5/2007 | Parkes | 367/23 |
| 2003/0168277 A1 | 9/2003 | Hopperstad et al. | |
| 2004/0136266 A1 * | 7/2004 | Howlid et al. | 367/21 |
| 2005/0090987 A1 * | 4/2005 | Amundsen et al. | 702/14 |
| 2006/0164916 A1 * | 7/2006 | Krohn et al. | 367/41 |
| 2006/0193204 A1 * | 8/2006 | Davies et al. | 367/24 |
| 2006/0256658 A1 * | 11/2006 | Christie et al. | 367/43 |
| 2007/0230268 A1 * | 10/2007 | Hoogeveen et al. | 367/19 |

FOREIGN PATENT DOCUMENTS

| | | |
|---|---|---|
| EP | 0 066 423 B1 | 1/1988 |
| GB | 2 100 435 A | 12/1982 |
| GB | 2 414 314 A | 11/2005 |
| WO | 94/10585 A1 | 5/1994 |
| WO | WO 9410585 A1 * | 5/1994 |
| WO | 2004/068170 A1 | 8/2004 |

OTHER PUBLICATIONS

Johnston et al. SEG standards for specifying marine seismic energy sources. Geophysics. vol. 53. No. 4. Apr. 1998. pp. 566-575.*

Parkes et al. 'The signature of an air gun array: Computation from near-field measurements including interactions- Practical considerations' Geophysics, 1984, vol. 48, pp. 105-111.

Ziolkowski et al. 'Marine seismic sources: QC of wavefield computation from near-field pressure measurements' Geophysical Prospecting, 1997, vol. 45, pp. 611-639.

Ziolkowski et al. 'The signature of an air-gun array: Computation from near-field measurements including interactions' Geophysics, 1982, vol. 47, pp. 1413-1421.

* cited by examiner

NEAR-FIELD

FAR-FIELD 4

METHODS AND SYSTEMS FOR DETERMINING SIGNATURES FOR ARRAYS OF MARINE SEISMIC SOURCES FOR SEISMIC ANALYSIS

CROSS-REFERENCE TO RELATED APPLICATIONS

This application claims the benefits of priority from Application Number 0526280.3, entitled "METHODS AND SYSTEMS FOR DETERMINING SIGNATURES FOR ARRAYS OF MARINE SEISMIC SOURCES FOR SEISMIC ANALYSIS," filed in the United Kingdom on Dec. 23, 2005, which is commonly assigned to assignee of the present invention and hereby incorporated by reference in its entirety.

BACKGROUND OF THE INVENTION

In seismic exploration it is known to generate seismic pulses or waves from at least one seismic source and to measure or record the produced wave-field using a plurality of seismic receivers. In this away, reflections, interactions or the like of the seismic pulses with earth formations may be analyzed. A problem in the analyzing of received seismic pulses is the determination and/or filtering of a signature of the signal source so that the source signal can be removed for the received data leaving only the effects of the reflections, interactions and/or the like of the pulses with the earth formations.

Seismic sources are either of the impulse type generating a sharp and sudden peak of wave energy or, alternatively, of the vibrating type generating a sweeping signal of ideally controlled amplitude and frequency spectrum. Marine seismic sources commonly used are impulsive sources comprising a plurality of so-called "air guns" as source elements arranged in an array to produce a combined seismic source which has more desirable characteristics than the individual source elements of the array. Marine vibratory sources exist but are less frequently used.

In marine seismic exploration, an air gun may be used to generate a high pressure air bubble by the sudden discharge of a quantity of high pressure compressed air into the water surrounding the air gun. According to established theoretical knowledge, the elasticity of the air couples with the inertial mass of the surrounding water to produce an oscillating system as the air expands and contracts in size until its energy is dissipated in the water and the bubble reaches its equilibrium volume. These bubble oscillations generate spherical sound waves, which form the seismic signal. As described below in further detail, marine seismic signals may be synchronized so as to enhance the primary pulse in an acquisition method referred to as peak-tuning, or, if the synchronization is tuned to the first bubble, bubble-tuning. The synchronization may alternatively be tuned to any other part of the composite signature of the source.

It is a feature of an array of marine seismic source elements, although not necessarily desirable, that the sound wave transmitted through the body of water is directional, i.e. the shape or signature of the transmitted wave varies with vertical polar angle, and azimuthal polar angle for a source not designed to be azimuthally symmetric (such special sources being described for example in United Kingdom patent GB 2376528). This is seen as a result of: (i) the array having dimensions which are not negligible compared to the wavelengths of sound in the transmitted wave; and (ii) the effect of the free-surface ghost reflection causing each source element to have an approximately equal and opposite virtual image source element in the free-surface mirror when observed at distances far from the source. In a given direction, the signature of a transmitted wave varies in the so-called "near field" as the distance from the array increases until at a sufficient distance from the array, in the so-called "far field", the shape of the wave remains substantially constant but the amplitude decreases, generally inversely in proportion to the distance from the array. The "far field" of an array or source generally exists at distances greater than $D^2/\lambda$ where D is the dimension of the array and $\lambda$ is the wavelength.

In U.S. Pat. No. 4,476,553 and in the European Patent EP 0066423, the entire disclosures of which are incorporated by reference herein, the use of an array of near-field hydrophones or pressure sensors arranged to measure the seismic signals generated by an array of air guns producing seismic signals in a body of water is disclosed. As disclosed, each of the hydrophones is placed in the near-field region (as discussed above) no closer than about 1 meter to an associated air gun to provide that the pressure measured at each of the of near-field hydrophones is a linear superposition of the spherical waves from all the oscillating bubbles and their reflections in the free surface. Using the signals obtained by the near-field hydrophones, a synthetic source signal may be derived. This derived synthetic source signal is referred to as a "notional source" and may be used to provide a way of determining the far-field signature of the array of air guns in all angular directions. As observed by Ziolkowski et al. in: Geophysical Prospecting, 1997, 45, 611-639, and in U.S. Pat. No. 4,476,553 col. 1, ll. 46-51 determination of the notional source may be complicated by sea bottom reflections and, as such, accurate marine seismic measurements using the methods described in the patents are confined to deep water seismography.

A variant of the marine seismic source described above is the TRISOR™ source used by WesternGeco Ltd. In the TRISOR™ source, a TRISOR™ marine source controller enables the air gun elements to be synchronized so as to enhance the primary pulse (peak-tuning), or the first bubble (bubble-tuning) or any other part of the composite air gun signature. TRISOR™ also allows acquisition of data from a hydrophone located near to each air gun element. Although commonly referred to as near-field hydrophones (NFH), the trace from each hydrophone is actually in the far-field of the acoustic pressure radiated from the air gun.

Using the TRISOR™ source, the notional source algorithm—as described in Ziolkowski, A., Parkes, G., Hatton, L. and Haugland, T., The Signature of an Air-Gun Array—Computation from Near-Field Measurements including Interactions, Geophysics 47, 1413-1421 (1982) and in European Patent EP 0066423—may be used to compute near-field and far-field signatures of the array as a whole directly below the marine source array, or for any take-off direction in the $2\pi$ steradians centered upon the vertical line below the acoustic centre of the array and characterized by vertical polar and azimuthal polar angles. Far-field in this context means a distance which is large compared to the scale length of the marine source array, typically 10-20 m, or its depth of immersion, typically 5-20 m, so that while the composite signature shape is independent of distance, it may still vary with direction.

Other inventions, such as described in U.S. Pat. No. 5,247,486, describe methods for determining a far-field signature of a plurality of seismic source elements by measuring a near-field signature of each seismic source element and interpolating a relationship between the measured near-field signature and a measured far field signature. As disclosed, an initial near-field signature of each seismic source element and an initial far-field signature of the plurality of N seismic source elements are measured simultaneously and an operator is determined from the measurements to calculate subsequent far-field signatures. Similarly, WO-2004068170-A1 discloses a method and apparatus for directional de-signature of a seismic signal. The method includes forming a plurality of far-field signatures representative of a plurality of seismic signals having a plurality of take-off angles, associating a plurality of traces representative of a plurality of reflections of the seismic signals with the plurality of far-field signatures, and forming a plurality of de-signatured traces from the plurality of traces and the plurality of associated far-field signatures. While such inventions provide methods other than the notional source method of removing the source signal from the received seismic signal, they may not be as robust as the notional source methods and they do not address the need for a notional source method that may be used in shallow waters.

SUMMARY OF THE INVENTION

Embodiments of the present invention solve at least the problems discussed above by providing systems and methods for determining a source signature for an array of seismic sources that incorporates factors that provide for the inclusion of sea-floor reflection effects in the determined source signature. According to an embodiment of the present invention, there is provided a method of deriving a signature for an array of seismic sources providing for sea-floor reflection effects including the steps of:

generating a plurality of output signals from a plurality of seismic sources where the output signals may combine to create a seismic signal for seismic analysis of earth formations below a body-of-water;

measuring at a plurality of locations a pressure field produced by the plurality of output signals; and determining the source signature for the array using the plurality of pressure field measurements and reflections of the plurality of outputs from the sea-floor.

In certain aspects, higher multiples of the reflections from the sea-floor may be used in the determination of the signature. A sea-floor reflection coefficient may also be included in the determination of the signature to provide for attenuation of the output signals when reflected from the sea-floor. The sea floor reflection coefficient can be in the range of almost zero, e.g. 0.01, to +1 and can be deduced from known sediment or rock condition on the sea-floor or can be determined from the near-field source signature measurement. Further, aspects provide for determining water depth for use in the determination, where water depth may provide for determining a distance between the measurement locations and images of the seismic source created by the reflections from the sea-floor and/or for determining timing factors.

In a further embodiment, there is provided a method of deriving a signature for an array of seismic sources providing for sea-floor reflection effects including the steps of:

measuring at m different locations a pressure field created by n marine seismic sources in an array of n marine seismic sources, wherein positions of each of the m different locations relative to the array of n marine seismic sources are known; and using a processor to process the signature for the array of n marine seismic sources and including sea-floor reflection effects in the processed signature for the array of n marine seismic sources comprises:

forming a set of m simultaneous equations, wherein each of the m simultaneous equations in the set of m simultaneous equations relates one of the m different measurements of the pressure field at one of the m different locations to a summation of n individual signatures, wherein each of the n individual signatures represents a pressure signature produced by one of the n marine seismic sources at the one of the m different locations, and wherein each of the simultaneous equations in the set of m simultaneous equations contains a relative location factor configured to account for distance from the one of the m different locations to the array of n marine seismic sources, a sensitivity factor configured to account for sensitivity of a measuring device used to measure the pressure field at the one of the m different locations, a seafloor reflection factor configured to account for reflection of each of the individual acoustic signals from the sea-floor and a sea-surface reflection factor configured to account for reflection of each of the individual acoustic signals from the sea-surface;

using the measurements of the pressure field at the m different locations, the relative location factor, the sensitivity factor, the sea-floor reflection factor and the sea-surface reflection factor to solve the m simultaneous equations and derive each of the n individual signatures for each of the n marine seismic sources; and producing the source signature for the array of the n marine seismic sources with the factoring for sea-floor reflections by superposing each of the n individual signatures.

In certain embodiments of the present invention, the sea-floor may be treated as a plane reflector and a reflection coefficient for sea-floor reflections may be built into the m simultaneous equations. By treating the sea-floor as well as the sea-surface as plane reflectors, images of a seismic source may be determined by scaling the output from the seismic source with the reflection coefficient of the sea-surface and/or the sea-floor and mirroring the position of the output onto the sea-surface and/or the sea-floor. Path lengths for acoustic waves traveling from the image to a detector may be determined by mapping the relevant path associated with the image from the seismic source to the hydrophone via reflection(s) from the sea-floor and/or the sea-surface. From these path lengths and the respective reflection coefficients of the sea-floor and the sea-surface, the m simultaneous equations may be solved to determine individual signatures for each of the seismic sources in the array that incorporates the effects of sea-floor reflections. From these individual signatures, a source signature for the array of seismic sources may be processed that includes sea-floor reflections of signals emitted from the array and, as such, the array may be used for seismic analysis in shallow waters, including around the continental shelf, etc.

BRIEF DESCRIPTION OF THE DRAWINGS

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The present invention will become more fully understood from the detailed description and the accompanying drawings, wherein.

DETAILED DESCRIPTION

In the following description, for the purposes of explanation, specific details are set forth in order to provide a thorough understanding of the invention. However, it will be apparent that the invention may be practiced without these specific details.

Embodiments of the present invention provide systems and methods for deriving a source signature for an array of seismic sources for marine seismic analysis, wherein the systems and methods include factors for determining the source signature so as to take into consideration both sea-surface and sea-floor reflections of signals produced by the seismic sources. In certain aspects, factors that include reflection coefficients of the sea-surface and the sea-floor and image to detector distances are included in a series of simultaneous equations that may be processed to determine a source signature for the array that accounts for sea-floor reflections of seismic source signals.

Figure 1:
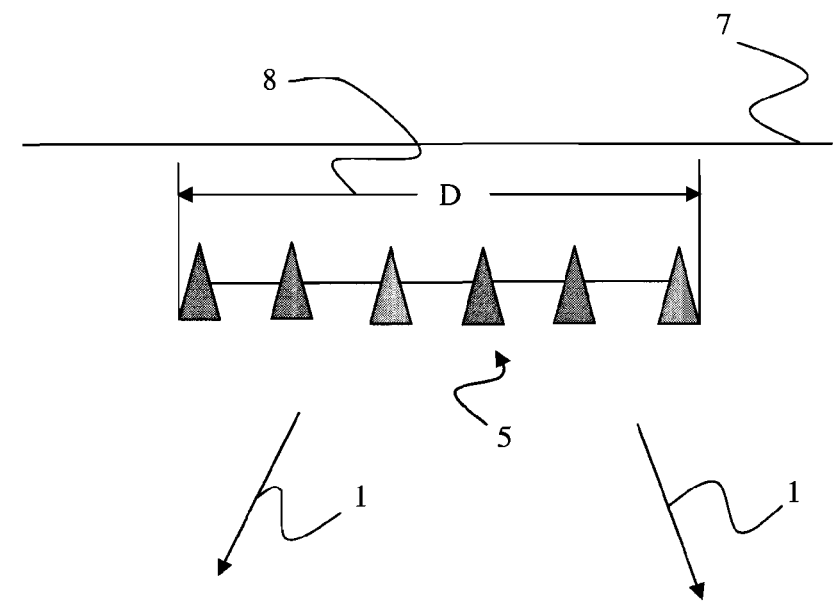
FIG. 1 illustrates propagation of a signature from an array of seismic sources, such as may be used in embodiments of the present invention.
Figure 1:
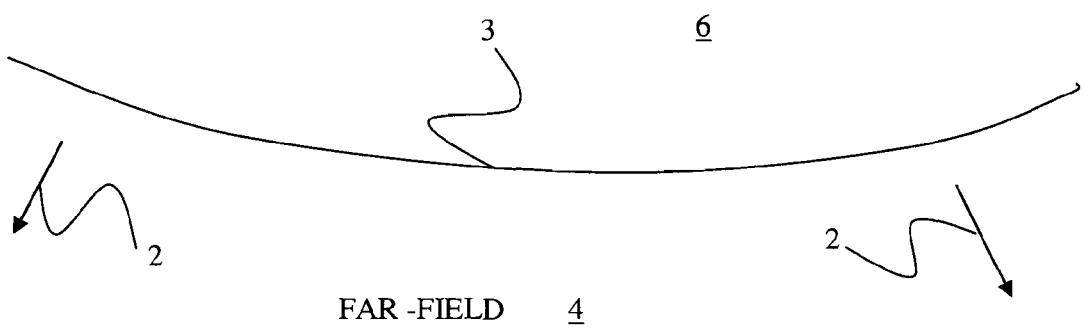

FIG. 1 illustrates propagation of a signature from an array of seismic sources, such as may be used in embodiments of the present invention. As depicted, an array of seismic sources 5 provides a signature that is a combination of the outputs from each of the seismic sources in the array of seismic sources 5. In the illustration, the array of seismic sources has a dimension D 8 and is located just below a sea-surface 7.

In FIG. 1, a near-field region 6 is shown bounded by a notional boundary 3 with a far-field region 4 on the other side of the notional boundary 3. In the near-field region 6, a near-field signature from the array of seismic sources 5, shown as arrow 1, varies with increasing distance from the array of seismic sources 5. However, at the notional boundary 3, the near-field signature from the array of seismic sources, shown as arrow 1, may assume a stable form. In the far-field region 4, a far-field signature from the array of seismic sources, shown as arrow 2, maintains a constant shape, but the amplitude of the signature decreases at a rate inversely proportional to the distance from the array of seismic sources 5, in accordance with the law of conservation of energy. The notional boundary 3 separating the near-field region 6 and the far-field region 4 is located at about a distance equivalent to $$\frac{D^2}{\lambda}$$

where D is the dimension D 8 of the array and lambda is the wavelength of the signature.

Figure 2A:
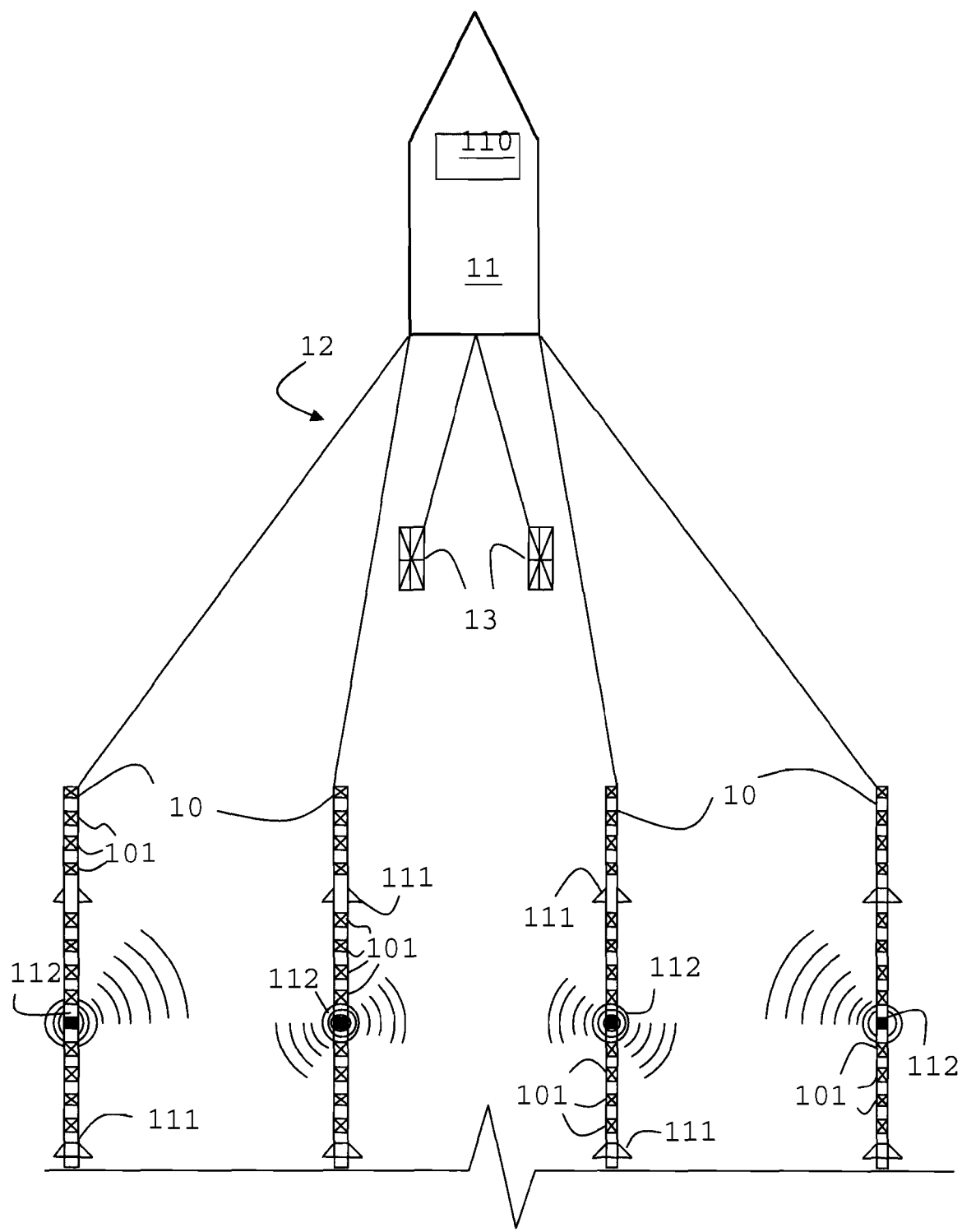
FIGS. 2A-2C provide a schematic illustration of equipment for seismic data acquisition in a marine environment, which may be used in an embodiment of the present invention.

FIG. 2A depicts a typical marine seismic acquisition system; such a marine seismic acquisition system may be used in embodiments of the present invention. As depicted, four instrumented cables or streamers 10 are towed by a ship 11. A front network 12 and similar tail network (not shown) is used to connect the vessel and the streamers. Embedded in the front network are seismic sources 13, typically an array of air guns. Each air gun is accompanied by a hydrophone (as shown in FIG. 2C, below).

Each streamer 10 is typically assembled from many hydrophone holder segments carrying hydrophones 101. Between segments, the streamers carry controllable deflectors 111 (often referred to as vanes or "birds") and other aids for steering the streamer along a desired trajectory in a body of water. The accurate positioning of modern streamers is controlled by a satellite-based positioning system, such as GPS or differential GPS, with GPS receivers at the front and tail of the streamer. In addition to GPS based positioning, it is known to monitor the relative positions of streamers and sections of streamers through a network of sonic transceivers 112 that transmit and receive acoustic or sonar signals.

Figure 2B:
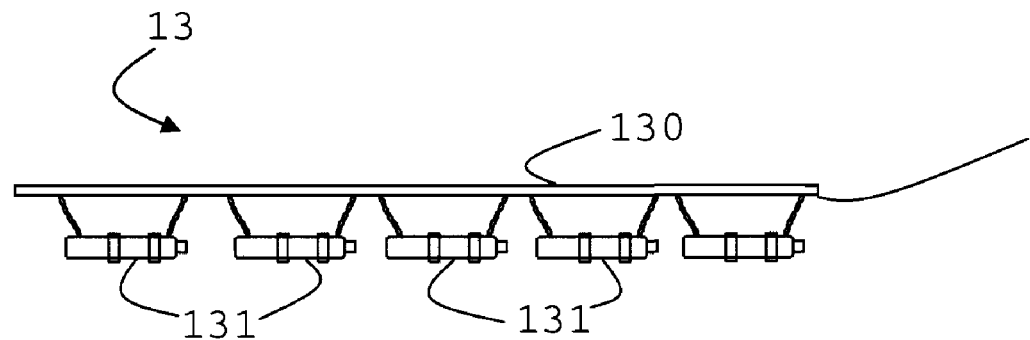
Figure 2C:
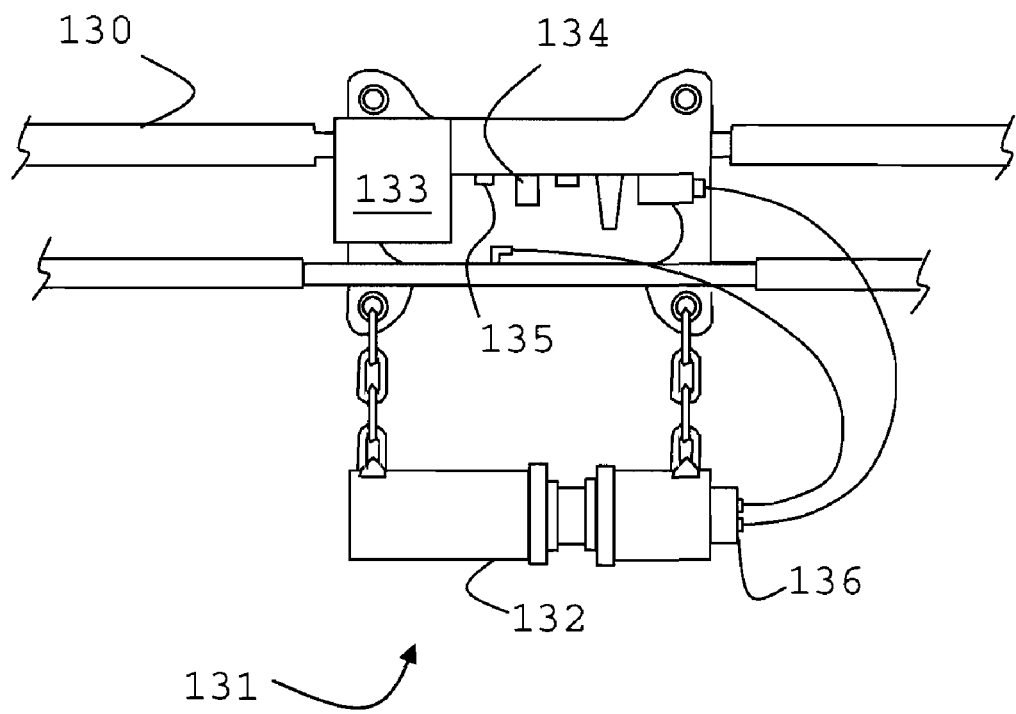

In FIGS. 2B-2C the marine source 13 is shown in greater detail. The seismic survey vessel 11 tows a marine source 13 which typically includes a suspension system 130 carrying a plurality of air guns 131, which generate superposed acoustic waves (not shown) in the water that travel in all directions including both towards the sea-floor and towards the sea-surface (also not shown), from which such waves are reflected down again, creating so-called ghosts of each air gun source. Removal of these ghost images from a received signal is important for accurate seismic analysis.

In FIG. 2C a single air gun 131 is shown in greater detail. The air gun is a calibrated marine source with a body 132 made of a Bolt-type air gun. The suspension system 130 includes data transmission cables. The air gun body 132 is connected to a data digitizer and source controller 133. The near-field hydrophone 134 may be used to capture transient pressure information to estimate the notional source signature. The plurality of near-field hydrophones may be used to compute a plurality of notional source signatures. Knowledge of the notional source signatures may, in turn, be used to calculate far-field signatures in any desired direction such as the far-field signatures for a plurality of vertical polar angles. Information about location of a sea-floor relative to the sea-surface may be obtained from a depth sensor 135 and additional information may be obtained from a gun sensor 136.

As illustrated, the seismic sources 13 may be air guns or clusters of air guns. However, the present invention is not so limited. In alternative embodiments, the seismic sources 13 may be any device capable of generating the desired acoustic wave, such as piezoelectric devices, cavitational water guns and/or the like.

In operation, the seismic sources 13 may impart an acoustic wave through the water and into the sea-floor. The acoustic wave reflects and refracts from various structures (also not shown) within the sea-bed and above the sea-floor, and the reflected and/or refracted wave (also not shown) is detected by the receivers 101 in the streamer 10. It should also be appreciated that the seismic streamer 10 may be an oceanbottom cable ("OBC"), or other sensing device located on the seafloor. OBCs may be deployed on the seafloor to record and relay data to the seismic survey vessel 11. In aspects, the seismic streamer 10 may be a set of geophones positioned in a borehole to provide for vertical seismic profiling of the borehole.

A signal processing unit 110 may be provided to process the analogue and/or digital signals that are generated by the receivers 101 and the source data. The signal processing unit 110 may comprise a data collection unit (not shown) and a data processing unit (also not shown). The signal processing unit 110 may be deployed on the seismic survey vessel 11. However, it will be appreciated by those of ordinary skill in the art that portions of the signal processing unit may be located in any desirable location, including, but not limited to, other vessels (not shown) and on-shore facilities (not shown).

Figure 3:
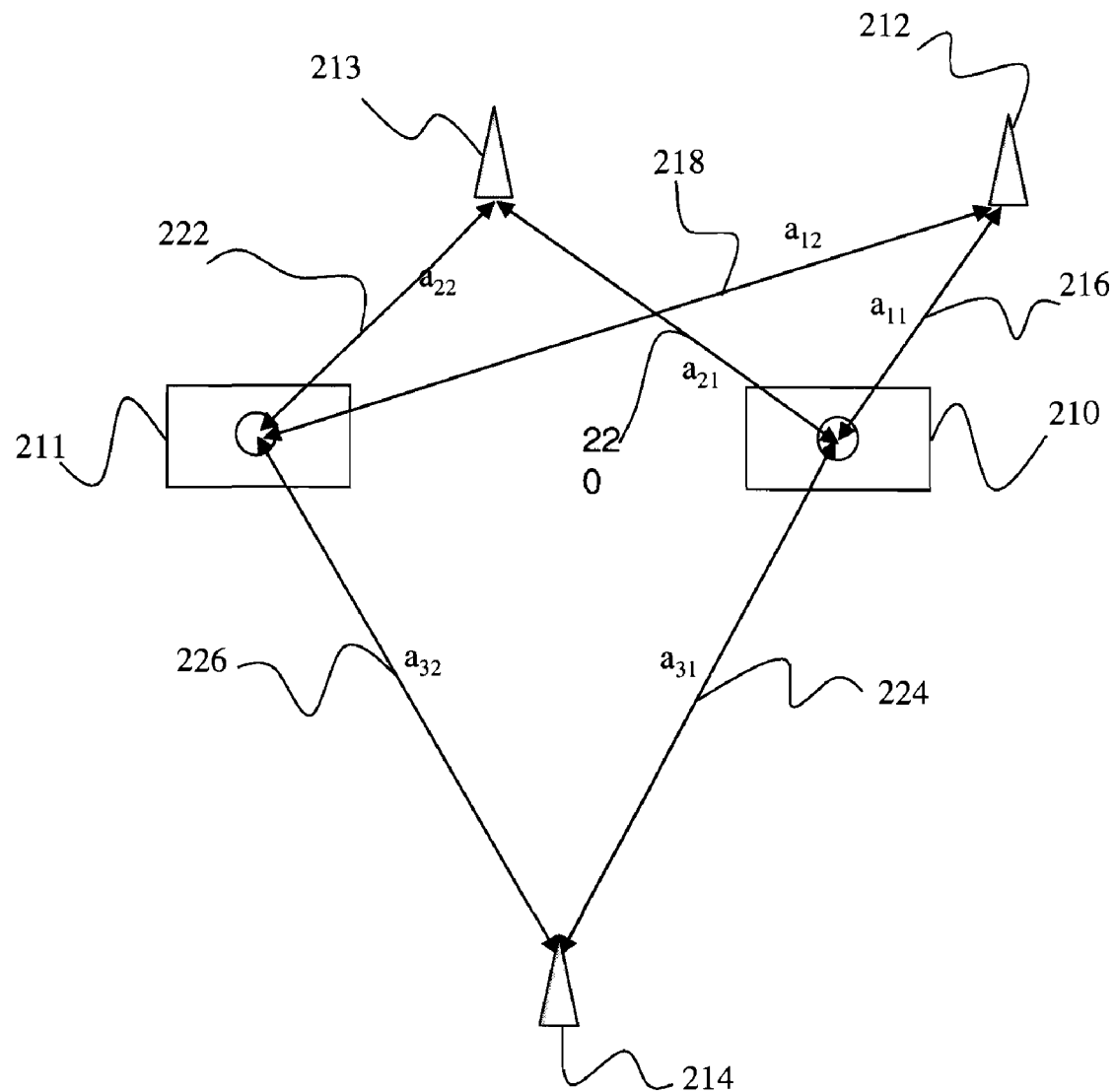
FIG. 3 illustrates a pair of seismic sources and a pair of hydrophones at set positions relative to one another, such as may be used for source signature determinations in accordance with an embodiment of the present invention.

FIG. 3 illustrates a pair of seismic sources and a pair of hydrophones for signature determinations, in accordance with an embodiment of the present invention. As illustrated, a first hydrophone 212 is positioned at a distance $a_{11}$ 216 from a first seismic source 210. The first hydrophone 212 is also located at a distance $a_{12}$ 218 from a second seismic source 211. Similarly, a second hydrophone 213 is positioned at a distance $a_{21}$ 220 from the first seismic source 210 and a distance $a_{22}$ 222 from the second seismic source 211.

As disclosed by Ziolkowski et al in U.S. Pat. No. 4,476,553, if the first seismic source 210 and the second seismic source 211 each emit an acoustic signal, the first hydrophone 212 would respond as follows:

$$\frac{h_1(t)}{s_1} = \frac{1}{a_{11}} \cdot p'_1\left(t - \frac{a_{11}}{c}\right) + \frac{1}{a_{12}} p'_2\left(t - \frac{a_{12}}{c}\right) \quad (1)$$

and the second hydrophone 213 would respond as follows:

$$\frac{h_2(t)}{s_2} = \frac{1}{a_{21}} \cdot p'_1\left(t - \frac{a_{21}}{c}\right) + \frac{1}{a_{22}} p'_2\left(t - \frac{a_{22}}{c}\right) \quad (2)$$

where $h_1(t)$ is the output from the first hydrophone 212, $h_2(t)$ is the output from the second hydrophone 213, $s_1$ is the sensitivity of the first hydrophone 212, $s_2$ is the sensitivity of the second hydrophone 213, c is the speed of sound in water, t is time (i.e. the time of the measurement relative to the time of the output from the seismic sources), $p'_1$ is an individual signature of the first seismic source 210 and $p'_2$ is an individual signature of the second seismic source 211 (wherein the individual signatures are the determined or notional signatures for each of the first and the second seismic sources that combine to produce the actual pressure field measured by the first and the second hydrophones). Equations (1) and (2) may be solved if the sensitivity of the first hydrophone 212 and the second hydrophone 213 as well as the location of the first hydrophone 212 and the second hydrophone 213 relative to the first seismic source 210 and the second seismic source 211 are known.

In practice, the sensitivities of the hydrophones may be measured, provided by a manufacturer and/or the like and the first hydrophone 212 and the second hydrophone 213 may be positioned in known positions relative to the first seismic source 210 and the second seismic source 211 to provide for calculation of the individual signatures of the first seismic source 210 and the second seismic source 211. Consequently, the two individual signatures of the first seismic source 210 and the second seismic source 211, as determined from processing the measured outputs of the first hydrophone 212 and the second hydrophone 213, may be used to determine a combined signature from the first seismic source 210 and the second seismic source 211 at a third hydrophone 214 located at a predetermined location such that a distance $a_{31}$ 224 from the first seismic source 210 and a distance $a_{32}$ 226 from the second seismic source are known. In certain aspects, a hydrophone may be positioned at the predetermined location to provide real-time feedback regarding the determined signature.

Accordingly, the combination of the two individual signatures from the first seismic source 210 and the second seismic source 211 at the third hydrophone 214 will be:

$$h_3(t) = s_3\left(\frac{1}{a_{31}} \cdot p'_1\left(t - \frac{a_{31}}{c}\right) + \frac{1}{a_{32}} \cdot p'_2\left(t - \frac{a_{32}}{c}\right)\right) \quad (3)$$

where $h_3(t)$ is the signal at the third hydrophone 214 as determined from the two individual signals from the first seismic source 210 and the second seismic source 211 at the third hydrophone 214. In this way, any position relative to the first seismic source 210 and the second seismic source 211 at the third hydrophone 214 may be selected and the signal at the location created by the first seismic source 210 and the second seismic source 211 may be calculated.

Accordingly, if there are n seismic sources in an array of seismic sources in a body of water to be used for seismic analysis, by using n calibrated hydrophones proximal to the n seismic sources at known locations relative to the seismic sources in the array, it is possible to take m independent measurements with the n hydrophones, form n simultaneous equations of the type shown in equations (1) and (2) and to solve the n simultaneous equations to determine the n individual signatures for each of the n seismic sources. From these n individual signatures, a source signature of the array may be built up and the signature of the array may be determined anywhere in the body of water. In certain embodiments of the present invention, redundancies may be built into the methods and apparatus for determining signatures of marine seismic sources by using m measurements to obtain individual signatures for n seismic sources, where m is greater than or equal to n. This redundancy may provide for reducing errors due to hydrophone malfunctions, localized issues such as water conditions, outside effects, localized abnormalities or the like and/or other factors that may affect the pressure measured by a hydrophone at a particular location that are unrelated to the output from the seismic sources. Additionally, the extra hydrophones may measure the actual pressure field at a location and this measurement may be analyzed with a determined source signature for the array at the location—which is determined by solving the simultaneous equations and superposing the individual signatures of the n seismic sources in the array—to provide for, among other things, essentially real-time analysis, calibration and/or the like.

In order to obtain measurements from which a meaningful solution can be obtained, it is sensible to position the m pressure sensitive detectors as close to the n corresponding source elements as possible. However, to obtain meaningful readings, the detectors and receivers should not be positioned too close together. For example, in the case where the source elements are air guns, the detectors must not be placed so close that they become enveloped by the bubbles from the air gun and, as a result, and not able to measure the pressure field in the water. For guns up to 300 cu. ins. at normal pressure (2000 psi) and depths (greater than about 3 meters), the hydrophones should be no closer than about 1 meter.

In a system comprising n seismic sources and m hydrophones, the combined signal or pressure field generated (the array of seismic sources produce bubbles that create a pressure field that moves through the body of water and this pressure field may be referred to herein as a signal, an acoustic wave or the like) from the n seismic sources at the ith hydrophone would be the summation of all of the individual signals from each of the n seismic sources, and according to equation (1) the measured signal or pressure field at the ith hydrophone would be:

$$h_i(t) = s_i \sum_{j=1}^{N} \frac{1}{a_{ij}} \cdot p'_j\left(t - \frac{a_{ij}}{c}\right) \quad (4)$$

where i=1, 2, 3 ..., M; j is the jth seismic source and $a_{ij}$ is the relative distance between the ith hydrophone and the jth seismic source.

From the n individual signals from the n seismic sources, the pressure field or signal from the array of seismic sources at any point may be computed by the superposition of all of the contributions (i.e. all of the individual signals) from all of the seismic sources:

$$p(t) = \sum_{j=1}^{N} \frac{1}{r_j} \cdot p'_j\left(t - \frac{r_j}{c}\right) \quad (5)$$

where j=1, 2, 3 ..., N; j is the jth seismic source and $r_j$ is the distance from the jth seismic source to the desired point. And because there are m simultaneous equations with n unknowns and m is greater to or equal to n, equation (5) may be solved to determine the pressure field or signature developed by the array of seismic sources at the desired location.

Considering the sea-surface as a plane reflector, each of the n seismic sources will create additional virtual signals due to the reflection of the output from the array of seismic sources from the sea-surface. As such, at the ith hydrophone it will appear as if there are signals from additional seismic sources, referred to herein as virtual seismic sources or images, and the strength of these additional signals from the virtual seismic sources will be dependant on the distance from the ith hydrophone to the jth virtual seismic source. Applying this relationship between the ith hydrophone and the virtual seismic sources, equation (4) may be adjusted to take account the effect of the virtual seismic sources on the signal measured by the ith hydrophone, such that:

$$h_i(t) = s_i\left(\sum_{j=1}^{N} \frac{1}{r_{oij}(t)} \cdot p'_j\left(t - \frac{r_{oij}(t)}{c}\right) + \frac{1}{r_{kij}} \cdot Rp'_j\left(t - \frac{r_{kij}(t)}{c}\right)\right) \quad (6)$$

where: i=1, 2, 3 ..., M and M is greater then or equal to N; R is the reflection coefficient of the sea-surface; $r_{oij}(t)$ may be the distance from the ith hydrophone to the jth seismic source; and $r_{kij}(t)$ may be the distance from the ith hydrophone to the jth virtual source. As persons of skill in the art may appreciate, in certain aspects, $r_{oij}(t)$ may be the distance from the ith hydrophone to the jth bubble produced by the jth seismic source that creates the seismic signal and $r_{kij}(t)$ may be the distance from the ith hydrophone to the jth virtual bubble produced by the jth virtual seismic source.

In the equations above, an assumption is made that Doppler effects and the like are not an issue, such that:

$$r_{ij}\left(t - \frac{r_{ij}(t)}{c}\right) \approx r_{ij}(t)$$

Figure 4:
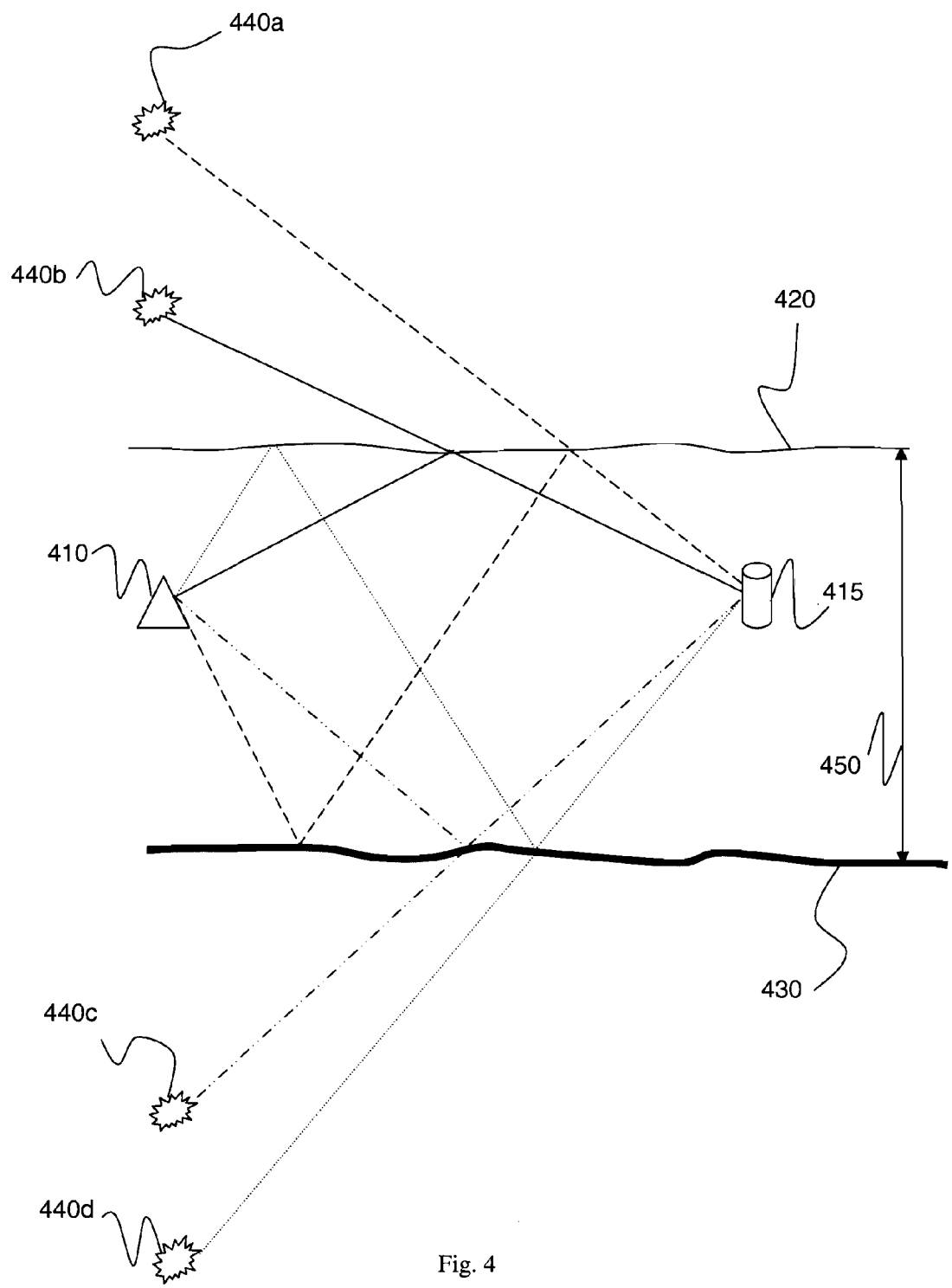
FIG. 4 illustrates virtual images of a seismic source as seen by a hydrophone due to sea-surface and sea-floor reflections the effects of said virtual images may be accounted for in source signature derivations in accordance with embodiments of the present invention.

This assumption is generally fulfilled, since the relative velocity between a bubble and a hydrophone is much smaller than the acoustic velocity. Further, in equation (6) $r(t)_{oij}$ and $r(t)_{kij}$ may contain one or more variable components resulting from the relative motion of the hydrophones and the bubbles emitted from the seismic sources because in certain aspects the hydrophone may be towed through the body of water causing a relative change in position of the hydrophone relative to the position that the seismic source was activated and/or the bubbles produced by the seismic sources may rise or travel through the body of water relative to the hydrophone. The varying component due to towing the hydrophones through the body of water on $r_{oij}(t)$ and $r_{kij}(t)$ may be accounted for by factoring in the velocity of the craft towing the hydrophones. Alternatively, sensors or the like may be associated with the hydrophones and/or the seismic sources to provide location information to a processor processing the simultaneous equations and the source signature of the array and/or effects of bubble motion in the body of water may be analyzed and factored into $r_{oij}(t)$ and/or $r_{kij}(t)$ FIG. 4 illustrates how sea-floor reflection in combination with sea-surface reflection may cause an ith hydrophone to see multiple outputs from or virtual seismic sources related to a single seismic source, in accordance with an embodiment of the present invention. As depicted, a seismic source 410 may produce a seismic signal that may be used for seismic analysis and/or signal analysis. The seismic signal produced by the seismic source 410 may be detected by an ith hydrophone 415. However, the seismic signal may be reflected from the sea-surface 420 and the sea-floor 430 and, as a result, the ith hydrophone 415 may see multiple virtual images 440 of the seismic source.

In an embodiment of the present invention, the multiple reflections from the sea-surface and the sea-floor received by the ith hydrophone 415 may be taken into account in a determination of the signal measured by the ith hydrophone 415 by adjusting equation (6) so as to include a factor for incorporating sea-floor reflection into the notional source determination as follows:

$$h_i(t) = s_i\left(\sum_{j=1}^{N} \frac{1}{r_{oij}(t)} \cdot p'_j\left(t - \frac{r_{oij}(t)}{c}\right) + \sum_{k=1}^{K}\sum_{j=1}^{N} \frac{R_k}{r_{kij}(t)} \cdot p'_j\left(t - \frac{r_{kij}(t)}{c}\right)\right) \quad (7)$$

where: i=1, 2, 3 ..., M and M is greater then or equal to N; $r_{kij}$ is a distance from the jth virtual source associated with the kth reflector to the ith hydrophone, $R_k$ is the effective reflection coefficient of the kth reflector. In certain aspects, the sea-floor may be considered, as the sea-surface is considered in equation (6), as a plane reflector With regard to the effective reflection coefficient $R_k$, this coefficient can be derived from measurement or chosen to be in the range of larger than 0, hence near to total absorption =, to +/−1 representing total reflection with or without phase change. For multiple reflections the coefficient can be derived as the product of the reflection coefficients of the different surfaces the seismic signal is reflected from on its path between the seismic source 410 and the hydrophone 415. For example, for a virtual image 440a, the effective reflection coefficient $R_k$ may be equivalent to the reflection coefficient of the sea-surface multiplied by the reflection coefficient of the sea-floor.

By mirroring the output from the seismic source 410 from the sea-surface and/or the sea-floor, the wave-path of an acoustic signal traveling between the seismic source and the hydrophone may be determined. In an embodiment of the present invention, the water depth 450 between the sea-surface 420 and the sea-floor 430 and the wave-path of an acoustic wave traveling between the seismic source and a detector may be used to determine $r_{kij}$—the distance from the jth virtual source associated with the kth reflector to the ith hydrophone. In certain aspects, more accurate determinations of $r_{kij}$ and/or the effective reflection coefficient of the sea-floor may be obtained by taking into consideration the tilt of the sea-floor. However, because the tilt of the sea-floor is, in general, negligible, various embodiments of the present invention may not provide a factor relating to the tilt of the sea-floor into account.

In some embodiments of the present invention the reflection coefficient of the sea-floor and/or the water depth 450 may be measured for signal analysis purposes. In other embodiments, the reflection coefficient of the sea-floor and/or the water depth 450 may be estimated from near-field hydrophone data.

Figure 5:
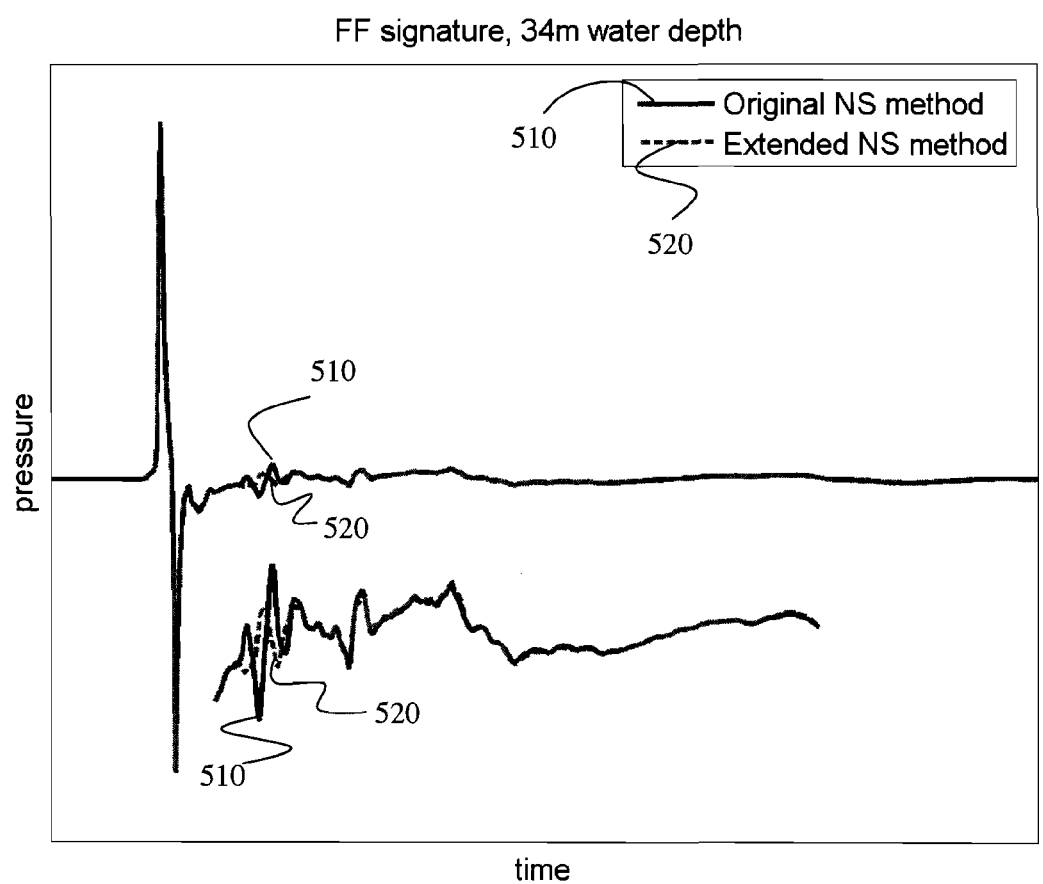
FIG. 5 provides a comparison of a far-field signature of an array of seismic sources computed with a source signature determination method that does not include factors for sea-floor reflection and a source signature determination method that does include factors for sea-floor reflection, such as in accordance with embodiments of the present invention.

FIG. 5 provides a comparison of a far-field signature of an array of seismic sources computed with a source signature method that does not include factors for sea-floor reflections and a source signature method that includes factors for sea-floor reflection in accordance with embodiments of the present invention. As illustrated, the computed output signature for the array of seismic sources without factoring for sea-floor reflection is shown by waveform 510 and the computed output signature for the array of seismic sources with sea-floor reflection factors is shown by waveform 520. As may be appreciated by persons with skill in the art, effects of reflections from the sea-floor may be attenuated in embodiments of the present invention compared to the source signature computations in the prior art. For purposes of the depicted computation, an array of 18 seismic sources was analyzed in a water depth of 34 meters.

Figure 6:
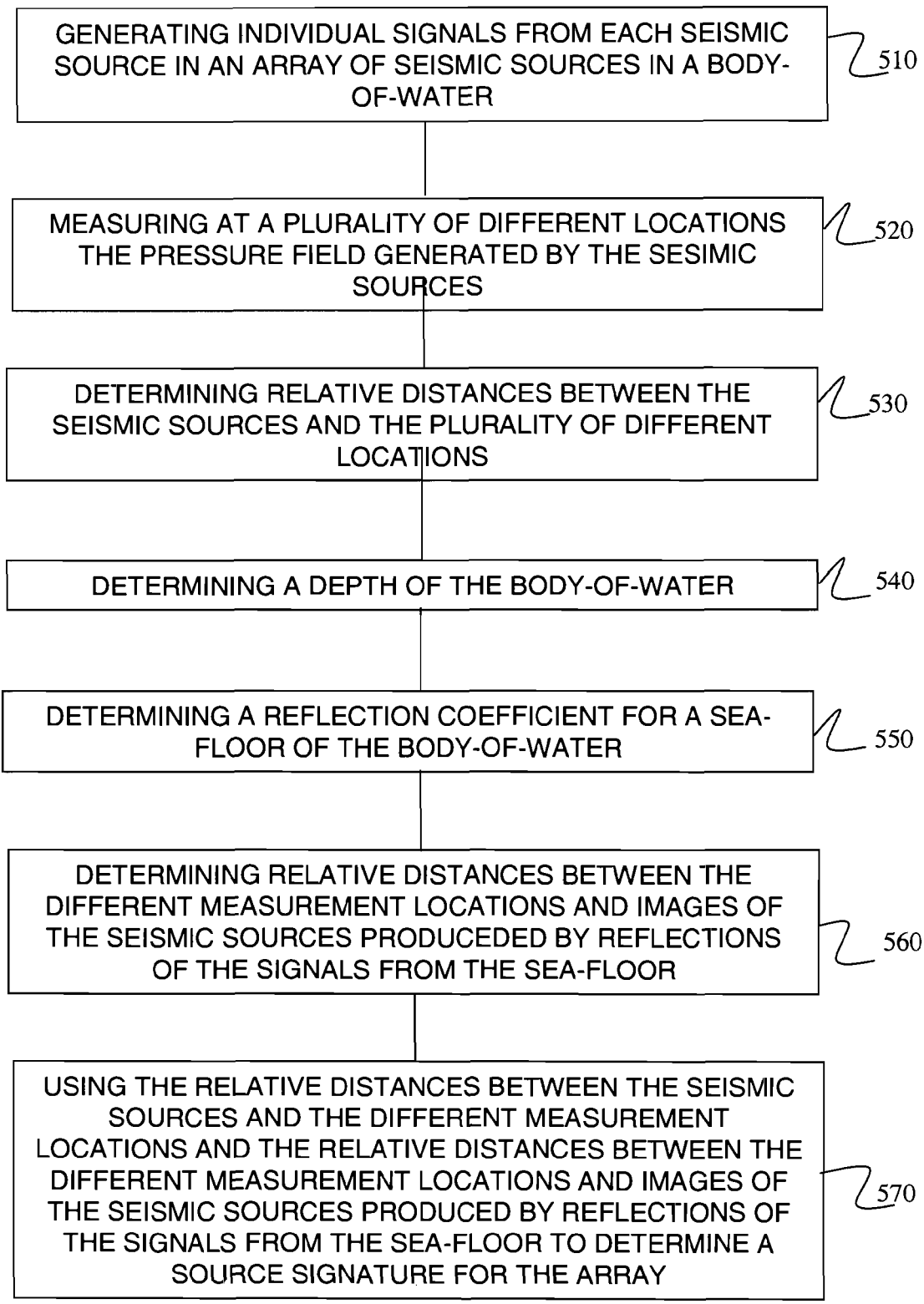
FIG. 6 is a flow-type diagram of computation of a source signature with correction for sea-floor reflections, in accordance with an embodiment of the present invention.

FIG. 6 is a flow-type diagram of computation of a source signature with correction for sea-floor reflections, in accordance with an embodiment of the present invention. In step 510 each seismic source in an array of seismic sources located in a body-of-water generates a signal. In certain aspects, the seismic sources may be air guns that each generates bubbles that cause acoustic waves to be formed in the body of water and the combination of the acoustic waves may be a seismic signal for use in seismic analysis. In step 520 measurement devices at different locations in the body of water may measure a pressure field in the body-of-water generated by the outputs from the seismic sources.

In step 530 relative distances between the measurement locations and the seismic sources are determined. The measurements may be performed using hydrophones positioned at the measurement locations and the positions of the hydrophones relative to the seismic sources may be known. In certain aspects, the hydrophones may be towed through the body of water behind a water craft. As such, the relative distances between the hydrophones and locations of the seismic source when the seismic sources emitted the output signals may include a factor due to velocity of the hydrophones relative to the positions of the seismic source the output signals were emitted. This velocity factor may be accounted for using the velocity of the water craft and knowing a signal time when the output signals were produced and a measurement time when the measurements of the pressure field were made. Additionally, the outputs from the seismic sources may travel through the body of water, i.e. as rising bubbles and this motion may be factored into the relative distance determination.

In step 540 a depth of the body of water may be determined. The depth may be determined by direct measurement, such as by ultrasound of the like, or from the seismic source outputs and the hydrophone measurements. Similarly, in step 550 a reflection coefficient of the sea-floor of the body-of-water may be determined. This may be determined from direct measurements of reflections of acoustic waves from the sea-floor or from the outputs of the seismic sources and the hydrophone measurements.

In step 560 relative distances between images of the seismic sources and the measurement locations may be determined. These distances may be determined by mirroring the outputs from the seismic sources off of the sea-floor. In certain aspects, the relative distances between the seismic source images and the measurement locations may be obtained using the depth, the sea-floor reflection coefficient and/or the tilt of the sea-floor. In step 570, a processor or the like may determine a source signature for the array from the measurements of the pressure field, the relative distances between the measurement locations and the seismic sources and the dances between the images of the seismic sources resulting from reflections of the output signals from the sea floor.

Figure 7:
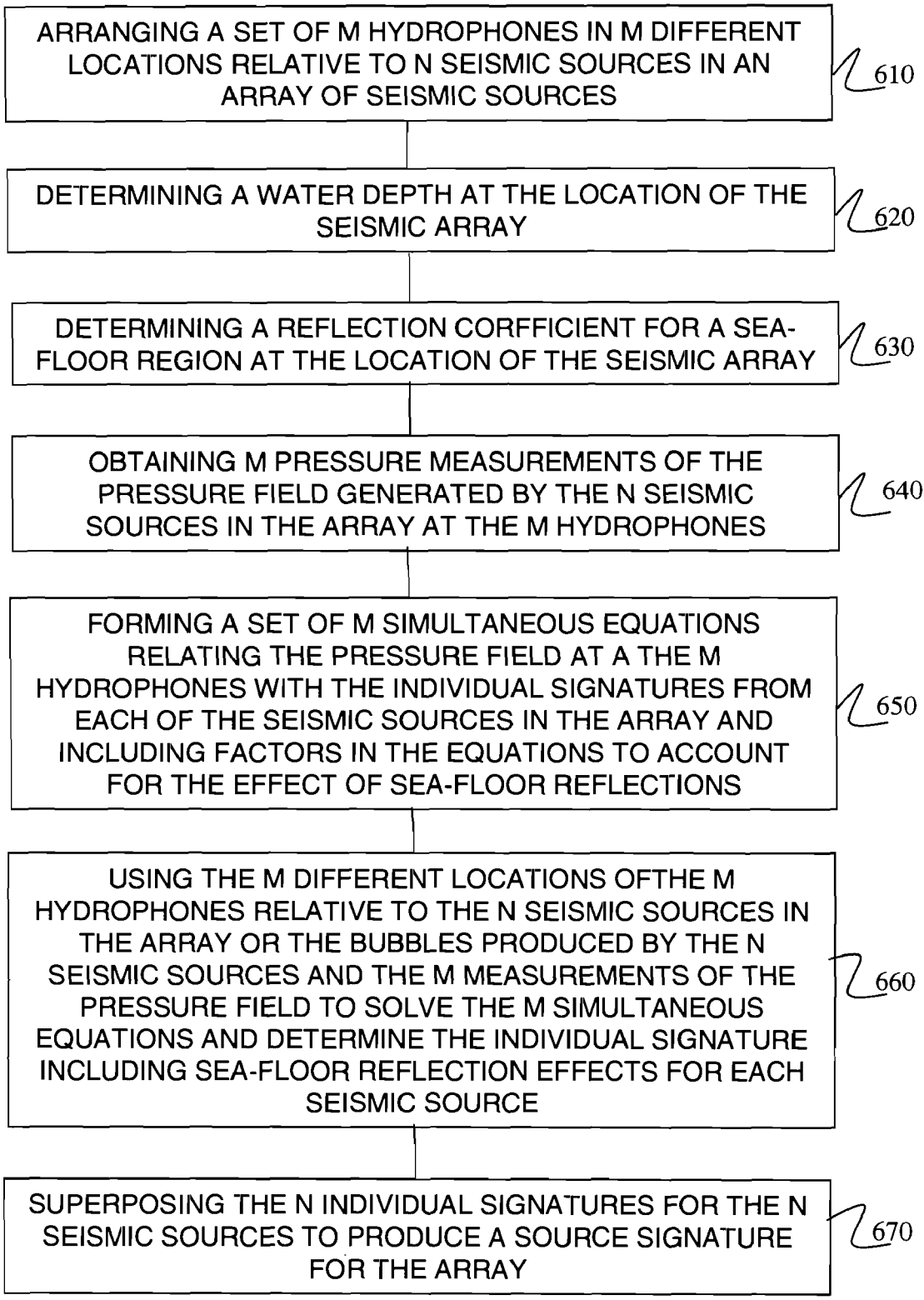
FIG. 7 is a flow-type diagram of a further computation of a source signature with correction for sea-floor reflections, in accordance with an embodiment of the present invention.

FIG. 7 is a flow-type diagram of a further computation of a source signature with factoring for sea-floor reflection effects, in accordance with an embodiment of the present invention. In step 610 a set of m hydrophones are positioned in predetermined locations relative to a set of n seismic sources in an array, wherein the array is for use as a marine seismic source for seismic analysis of earth formations or borehole configurations. The seismic sources may be air guns or the like capable of producing bubbles that cause acoustic waves to be emitted in the body of water surrounding the seismic sources. As discussed above, the hydrophones may be positioned about a meter away from the seismic sources in a near-field region. In step 620, water depth may be determined. Water depth may be directly measured, theoretically determined and/or interpreted from measurements of acoustic signals received by the hydrophones from the seismic sources.

In step 630, a reflection coefficient for the sea-floor region may be determined. As with the water depth, the sea-floor reflection coefficient may be measured, theoretically determined and/or interpreted from outputs of the hydrophones in response to signals from the seismic sources.

In step 640, the seismic sources are used to produce an acoustic signal in the body of water and the hydrophones are used to measure the pressure field generated by the seismic sources at the m locations where the hydrophones are positioned. In step 650, a set of m simultaneous equations are formed that relate the pressure field at the predetermined locations with individual signatures for each of the seismic sources. Each individual signature for a seismic source is such that in combination with the individual signatures from all the other seismic sources it would produce the pressure field as measured by the hydrophone.

The simultaneous equations may include a sea-floor reflection factor to provide that reflections of signals from the seismic sources from the sea-floor are included in each of the seismic source's individual signatures. Sea-floor reflections may occur when a signal from a seismic source is directly reflected from the sea-floor, when a signal from a seismic source is reflected from the sea-surface and then onto the sea-floor or when there are multiple reflections of the signal between the sea-surface and the sea-floor prior to detection. The sea-floor reflection factor may be one or more factors that provide for reflections of acoustic signals from the sea-floor. The sea-floor reflection factors may comprise a sea-floor reflection coefficient as well as provide for the acoustic wave paths between the hydrophones and the seismic sources. The acoustic wave paths may be determined by mirroring the acoustic signals from the seismic sources onto the sea-floor, based upon the assumption that the sea-floor behaves as a plane reflector. Length of the acoustic wave paths may be determined from the sea depth and/or the distance between the seismic sources and the hydrophones.

In step 660, a processor or the like may process the locations of the m different hydrophones relative to the array of seismic sources and the outputs of the m different hydrophones as well as the sea-floor reflection factors to solve the m simultaneous equations to ascertain an individual signature for each of the seismic sources that includes effects of sea-floor reflections. The positions of the hydrophones relative to the seismic sources may take into account that the system is not static and provide for the relative motion of the hydrophones to the location where the seismic source generated the bubbles giving rise to the seismic signals, the motion of the bubbles relative to the hydrophones and/or the like.

In step 670, all of the individual signatures for the n seismic sources are superposed to determine a source signature for the array. Having determined the source signature, the output signature of the array may be calculated at any location in the body of water and this output signature may be used to filter seismic data obtained at the location so that reflections etc from earth formations may be analyzed.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims. Although specific embodiments of the invention have been described, various modifications, alterations, alternative constructions, and equivalents are also encompassed within the scope of the invention. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators.

What is claimed is:

1. A method for determining a source signature for an array of N marine seismic source elements configured for use in a body-of-water with a sea-floor and a sea-surface, the method comprising the steps of:

generating an array output, the array output comprising a combination of an output from each of the N source elements in the array;

taking M pressure measurements at M different locations of the pressure field produced by the array output; and determining a source elements signature for each of the N source elements in the array by representing the M pressure measurements as a combination of contributions from each of the N source element signatures, wherein the representation includes factors which represent contributions from at least the first reflections of the source element signatures at the sea bottom.

2. The method of claim 1, further comprising the step of combining the determined N source elements signatures to determine a source array signature for the array.

3. The method as recited in claim 1, wherein multiples of the reflection from the sea-floor are included in the determination of the source element signatures.

4. The method as recited in claim 1, wherein the representation includes a sea-floor reflection coefficient.

5. The method as recited in claim 1, including the step of determining a water depth, wherein the water depth is a vertical distance between the sea-surface and the sea-floor at a location of the array, and using the water depth in the step of determining each of the source element signatures.

6. The method as recited in claim 1, wherein the step of determining the source element signatures for each of the N source elements in the array includes using a sea-floor reflection coefficient and a water depth, wherein the water depth is a vertical distance between the sea-surface and the sea-floor at a location of the array.

7. A method according to claim 1, wherein the step of determining a source element signature for each of the N source elements in the array comprises:

determining relative distances between each of the M different locations and positions of the N marine seismic sources;

determining a depth of the body-of-water;

determining a reflection coefficient of the sea-floor;

determining image relative distances between each of the M different locations and each image of the N marine seismic sources, wherein the images of the N marine seismic sources are produced from reflections of the signals from the sea-floor, and wherein the image relative distances are determined from the depth; and using the pressure measurements, the relative distances, the image relative distances and the reflection coefficient to determine the source element signatures for the N marine seismic sources, wherein the source element signature includes the attenuation of errors due to reflections of the signals from the sea-floor.

8. The method as recited in claim 7, wherein the relative distances are calculated between each of the M different locations and the positions of each of the N marine seismic sources at a signal time when the signals were emitted by the N seismic sources.

9. The method as recited in claim 1, wherein a value of M is greater than or equal to the value of N.

10. The method as recited in claim 1, wherein the sea-floor is treated as a plane reflector.

11. The method as recited in claim 1, wherein a reflection coefficient of the sea-floor is given a value of greater than 0 and less or equal to +1.

12. The method as recited in claim 1, further comprising: determining a tilt of the sea-floor.

13. The method as recited in claim 7, further comprising the step of determining a tilt of the sea-floor; and using the tilt of the sea-floor in the determination of the image relative distances.

14. The method as recited in claim 7, wherein the step of determining the image relative distances between each of the M different locations and the images of the N marine seismic source elements comprises mapping reflections of the signals from the sea-floor and a sea surface and using the depth to determine the image relative distances between each of the M different locations and each of the images of the N marine seismic source elements produced by the reflections of the output from the sea-floor and the sea-surface.

15. The method as recited in claim 14, wherein the sea-floor and the sea-surface are considered to be plane reflectors.

16. The method according to claim 2, further comprising the step of
using the array source signature to deconvolve seismic data.

17. The method of claim 1, further comprising the step of:
forming a set of M representations for each of the M pressure measurements as a sum of the contributions of each of the N source elements signatures, wherein each of the N source element signatures represents a pressure signature produced by one of the N marine seismic source elements, and wherein each of the M representations contains a relative location factor configured to account for a distance from the location of the pressure measurement to the position of the N marine seismic source elements taking into account the path of the output as reflected from the sea-floor, a sensitivity factor configured to account for sensitivity of a measuring device used to measure the pressure field at the one of the M different locations, a seafloor reflection factor configured to account for reflection from the sea-floor and a sea-surface reflection factor configured to account for reflection from the sea-surface of the output each of the individual seismic source elements;
converting the M representations into the N individual source element signatures; and
producing the source signature for the array by superposing each of the N individual source element signatures.

18. The method as recited in claim 17, wherein a length of the path is determined using a vertical depth measured between the sea-surface and the sea-floor and the relative location factor.

19. The method of claim 17, wherein the set of M representations are mathematically equivalent to the expressions $$h_i(t) = s_i \left( \sum_{j=1}^{N} \frac{1}{r_{oij}(t)} \cdot p_j\left(t - \frac{r_{oij}(t)}{c}\right) + \sum_{k=1}^{K} \sum_{i=1}^{N} \frac{R_k}{r_{kij}(t)} \cdot p_j\left(t - \frac{r_{kij}(t)}{c}\right) \right)$$

$$i = 1, 2, \ldots M \text{ and } M \geq N$$

where:
$h_i(t)$ is a value of the pressure field measured at an ith location of the M different locations;
$s_i$ is a sensitivity of an ith measuring instrument used to measure the pressure field at the M different locations;
$r_{oij}$ is a relative distance between a jth marine seismic source element in the array and the ith location of the M different locations;
c is a speed of sound in water;
$p_j$ is a jth individual source element signature determined for the jth marine seismic source;
t is time;
$R_k$ is an effective reflection coefficient of a kth reflector and the effective reflection coefficient is determined from one of a sea-surface reflection coefficient, a sea-floor reflection coefficient and a combination of the sea-surface reflection coefficient and the seafloor reflection coefficient;
$r_{kij}$ is a distance from an image of the jth marine seismic source including the reflection path caused by the kth reflector to the ith location of the M different locations.

20. The method of claim 17, wherein the relative location factor includes a velocity correction factor to account for a relative velocity between the M different locations and bubbles produced by the N marine seismic source elements, wherein the bubbles produced by the N marine seismic source elements are treated as sources of individual acoustic output.

21. The method as recited in claim 17, wherein a mapping of the path of the output includes a factor for a tilt of the sea-floor.

22. The method of claim 2, wherein the step of producing the source array signature for the array of the N marine seismic source elements comprises producing the source signature of the array at a predetermined point, and wherein the source signature of the array at the predetermined point is calculated by determining N relative distances between the N marine seismic source elements and the predetermined point, applying the N relative distances to the N individual signatures to find N determined individual signatures at the predetermined point and superposing the N determined individual signatures at the predetermined point.

23. The method of claim 22, wherein the step of producing the source signature for the array includes forming mathematical equivalents of:

$$p(t) = \sum_{j=1}^{N} \frac{1}{r_j} \cdot p'_j\left(t - \frac{r_j}{c}\right)$$

where: $p(t)$ is the source signature of the array at the predetermined point; $p'_j$ is the individual signature for the jth marine seismic source; and $r_j$ is the distance from the jth marine seismic source to the predetermined point.

24. The method of claim 1, wherein the M receivers are placed within a near field region with respect to the array of N marine seismic source elements.

25. Seismic data generated using a source signature for an array of N marine seismic source elements configured for use in a body-of-water with a sea-floor and a sea-surface, the signature being determined using the steps of:
generating an output from the N source elements, wherein the output comprises a combination of N source element signature, and wherein each of the M source element signatures is produced by one of the N source elements;
measuring M pressure field measurements produced by the output; and
determining each of the N source elements signatures by representing the M pressure field measurements as a combination of contributions from the N source element signatures, wherein the representation includes parts which represent contributions from at least the first reflections of the source element signatures at the sea bottom.

26. The Seismic data of claim 25 including seismic survey data deconvolved using the source signature for the array of N marine seismic source elements, wherein the source signature comprises a combination of the N source element signatures.

* * * * *